(12) United States Patent
Kimball et al.

(10) Patent No.: US 6,661,210 B2
(45) Date of Patent: Dec. 9, 2003

(54) APPARATUS AND METHOD FOR DC-TO-DC POWER CONVERSION

(75) Inventors: Donald Kimball, San Diego, CA (US); Joseph Archambault, San Diego, CA (US); Walter Haley, Escondido, CA (US)

(73) Assignee: Telfonaktiebolaget L.M. Ericsson (SE)

( * ) Notice: Subject to any disclaimer, the term of this patent is extended or adjusted under 35 U.S.C. 154(b) by 46 days.

(21) Appl. No.: 10/054,831

(22) Filed: Jan. 23, 2002

(65) Prior Publication Data

US 2003/0137286 A1 Jul. 24, 2003

(51) Int. Cl.[7] .................................................. G05F 1/40
(52) U.S. Cl. ........................ 323/268; 323/273; 323/282
(58) Field of Search ................................ 323/265, 268, 323/269, 273, 277, 280, 281, 282, 351

(56) References Cited

U.S. PATENT DOCUMENTS

| | | | | |
|---|---|---|---|---|
| 4,502,152 A | * | 2/1985 | Sinclair | 455/73 |
| 4,881,023 A | * | 11/1989 | Perusse et al. | 323/266 |
| 4,893,228 A | * | 1/1990 | Orrick et al. | 363/98 |
| 5,210,353 A | * | 5/1993 | Udovich et al. | 585/446 |
| 5,309,082 A | * | 5/1994 | Payne | 323/270 |
| 5,357,418 A | * | 10/1994 | Clavel | 363/89 |
| 5,592,072 A | * | 1/1997 | Brown | 323/268 |
| 5,617,305 A | | 4/1997 | Numata | |
| 6,130,525 A | * | 10/2000 | Jung et al. | 323/268 |
| 6,262,565 B1 | * | 7/2001 | Williams et al. | 323/237 |
| 6,300,826 B1 | | 10/2001 | Mathe et al. | |
| 6,480,367 B2 | * | 11/2002 | Shi et al. | 361/18 |

* cited by examiner

*Primary Examiner*—Adolf D. Berhane
(74) *Attorney, Agent, or Firm*—Coats & Bennett, P.L.L.C.

(57) ABSTRACT

A capacitorless DC-DC converter provides a controlled output voltage to a load, and includes a relatively wide bandwidth linear regulator placed in parallel with a switching regulator. Output signals from the linear regulator and switching regulator are added to form a combined output signal provided to the load. The switching regulator provides steady state current to the load, while the linear regulator provides higher-frequency transient current as needed. Because the linear regulator's transient response compensates for the limited transient response of the switching regulator, the substantial low-ESR output capacitance that is customarily required by conventional switching regulators is not needed. Further, feedback to the linear regulator taken from the combined output signal causes it to generate anti-phase ripple compensation, thereby reducing the magnitude of switching ripple in the converter's combined output signal.

38 Claims, 8 Drawing Sheets

APPARATUS AND METHOD FOR DC-TO-DC POWER CONVERSION

RELATED APPLICATIONS

This application claims priority under 35 U.S.C. §120 from the co-pending application Ser. No. 09/911,105, entitled "Apparatus and Method for Efficiently Amplifying Wideband Envelope Signals," filed on Jul. 23, 2001, and which is a continuation of the now-issued and identically titled U.S. Pat. No. 6,300,826 B1, and from which priority also is claimed.

BACKGROUND OF THE INVENTION

The present invention generally applies to power regulation applications, and particularly applies to capacitorless DC-to-DC power conversion.

DC-to-DC power conversion typically involves changing a power supply signal from one voltage to another to accommodate the operating voltage requirements of a given load. For example, many computer power supplies provide +24VDC and +12VDC supply output signals, which need to be converted to +5VDC or lower voltage signals for use with the various digital circuits in the computer. Of course, this is just one example of the virtually countless DC-to-DC power conversion applications.

Another common use for DC-to-DC conversion involves converting a battery voltage that changes over time into an essentially constant DC supply signal. This is useful where the circuits in question are optimized for operation at a fixed voltage but maximum battery life is required, e.g., where the discharge curve of the battery must be accommodated.

Two common approaches to DC-to-DC power conversion are linear conversion and non-linear conversion. Linear conversion typically uses some type of transistor as a pass device that may be linearly controlled to introduce a voltage drop from the input supply signal to the regulated output signal. Feedback from the output signal controls the bias on the pass device such that input-to-output voltage drop is varied as needed to maintain the output voltage at the desired voltage level.

Non-linear DC-to-DC power conversion typically uses some type of switching circuit in which one or more reactive components are charged and discharged by switching a supply voltage connection at a varying frequency and/or duty cycle to generate the desired output voltage. While switched-capacitor supplies are used, switched inductor circuits are more commonly applied where appreciable output power is required. Switching regulation usually offers greater efficiency than linear regulation, and oftentimes is the only viable solution in applications that require significant steady-state output power. This fact stems from the excessive power dissipation that arises in a linear regulator's pass element in applications involving high currents and/or high input-output voltage differentials.

However, switching regulators typically suffer from output noise problems and potentially poor transient response. Output noise is inherent in the on/off switching operation, while transient response is inherently limited by the bandwidth of the switching control loop of the most switching regulators. One approach to reducing these undesirable characteristics involves the use of output capacitance. Low Equivalent Series Resistance (ESR) capacitors placed on the output of a switching regulator serve as a low-impedance reservoir of current, which compensates for switching noise and provides transient current to the load.

However, including low ESR output capacitors in a switching regulator is not without drawbacks. For one, the amount of output capacitance required for satisfactory operation is oftentimes significant, leading to high design costs and significant printed circuit board space usage. Further, depending on the operating voltages involved, finding low ESR capacitors with the necessary voltage rating may be difficult. Other difficulties involve potential surge failures that sometimes plague tantalum capacitors, which are often used in low ESR applications.

BRIEF SUMMARY OF THE INVENTION

The present invention provides methods and apparatus for DC-to-DC power conversion that combines advantages of linear and non-linear power conversion. In an exemplary embodiment, a DC-to-DC converter according to the present invention comprises a parallel combination of linear and non-linear regulators, each providing a regulated output signal that is combined with the other to form a combined regulated output signal. The linear regulator, preferably comprising a linear amplifier circuit, provides most of the transient current required by the load, while the non-linear regulator, preferably a switching regulator, provides most of the steady state and lower frequency current required by the load. In this manner, power dissipation in the linear regulator is minimized, while the need for low ESR output capacitance on the switcher's output is substantially eliminated.

In at least some exemplary embodiments, the linear amplifier circuit includes an operational amplifier and has push-pull outputs capable of sourcing and sinking load current. The linear amplifier circuit controls its regulated output signal based on feedback taken from the combined regulated output signal, and a reference signal, which may be externally supplied or generated internally. With voltage feedback taken from the converter output, the linear amplifier circuit is made responsive to transient changes at the load, and is thus adapted to provide transient current in response to step changes in required load current. Further, the feedback signal includes ripple noise from the switching regulator, which causes the linear amplifier circuit to generate a compensating AC component on its output signal that acts to minimize overall ripple in the converter's output signal.

In at least some exemplary embodiments, the switching regulator is driven by a switching control signal that is dependent on sensing the output current of the linear amplifier circuit. A wideband current sensor circuit is preferably used for this purpose, and is driven by the differential voltage signal developed across a current sense element place in the output signal path of the linear amplifier circuit. The current sense signal serves as an input to a comparator circuit, preferably configured as a hysteretic comparator, which uses one or more switching set points that are based on the desired regulation voltage. The comparator generates the switching control signal such that the switching duty cycle and/or switching frequency of the switching regulator is controlled to maintain its output signal at the desired regulation voltage. Because the regulated output signal from the switcher is augmented by the regulated output signal of the linear amplifier circuit, low ESR capacitance is not required on the switching regulator's output.

Applications in which the inventive converter, in its various embodiments, may be advantageously used are numerous. For example, powering high-performance digital circuitry represents a general application of the converter. Loads of this type are often characterized by rapidly changing power requirements, and demanding input current requirements arising from the high-frequency digital switching that characterizes their operation. Radio base stations, with their abundance of signal processing resources, represent just one of the many types of systems where the converter might be used to significant advantage.

DETAILED DESCRIPTION OF THE INVENTION

Figure 1:
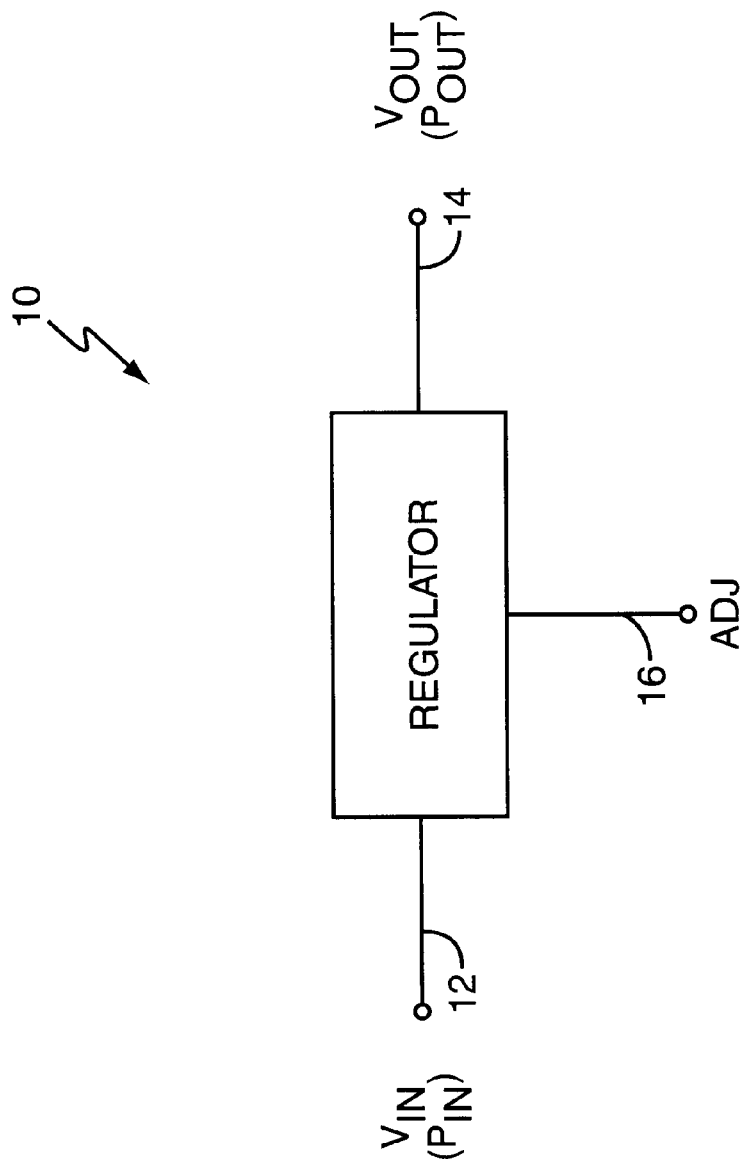
FIG. 1 is a diagram of a conventional linear regulator.

FIG. 1 illustrates a conventional linear regulator of the type commonly used for low-power voltage regulation. Externally, the device 10 comprises an input terminal 12, an output terminal 14, and an adjustment terminal 16. In operation, the device 10 provides a controlled voltage drop between input terminal 12 and output terminal 14 such that a desired, regulated output voltage appears on the output terminal 14. The adjustment pin 16 often serves as an output voltage feedback pin that drives an internal error amplifier (not shown) that is used in maintaining voltage regulation.

Internally, device 10 typically comprises some type of linearly controlled pass element (not shown), such as a PNP bipolar junction transistor (BJT) or other type of transistor device placed in the signal path between the input and output terminals 12 and 14, respectively. The feedback signal on pin 16 is used to bias the pass element so that the pass element maintains the needed input-to-output voltage drop.

Linear regulation according to the above scheme offers many advantages. First, linear regulation offers stable regulation control and good transient response. Transient response refers to the regulator's ability to respond to transient changes in line and load conditions. For example, many loads have varying current requirements and the regulator must be able to maintain the output voltage even with rapid changes in load current.

Linear regulators use their pass elements to dissipate the difference between the input power (Pin) and output power (Pout) as heat. This aspect of their operation results in inefficiency, because excess power is simply dissipated as thermal energy. Where the difference between the input voltage (Vin) and the output voltage (Vout) is large, or where the required load current (Iout) is high, linear regulation becomes impractical because of excessive power dissipation and attendant heating problems.

Figure 2:
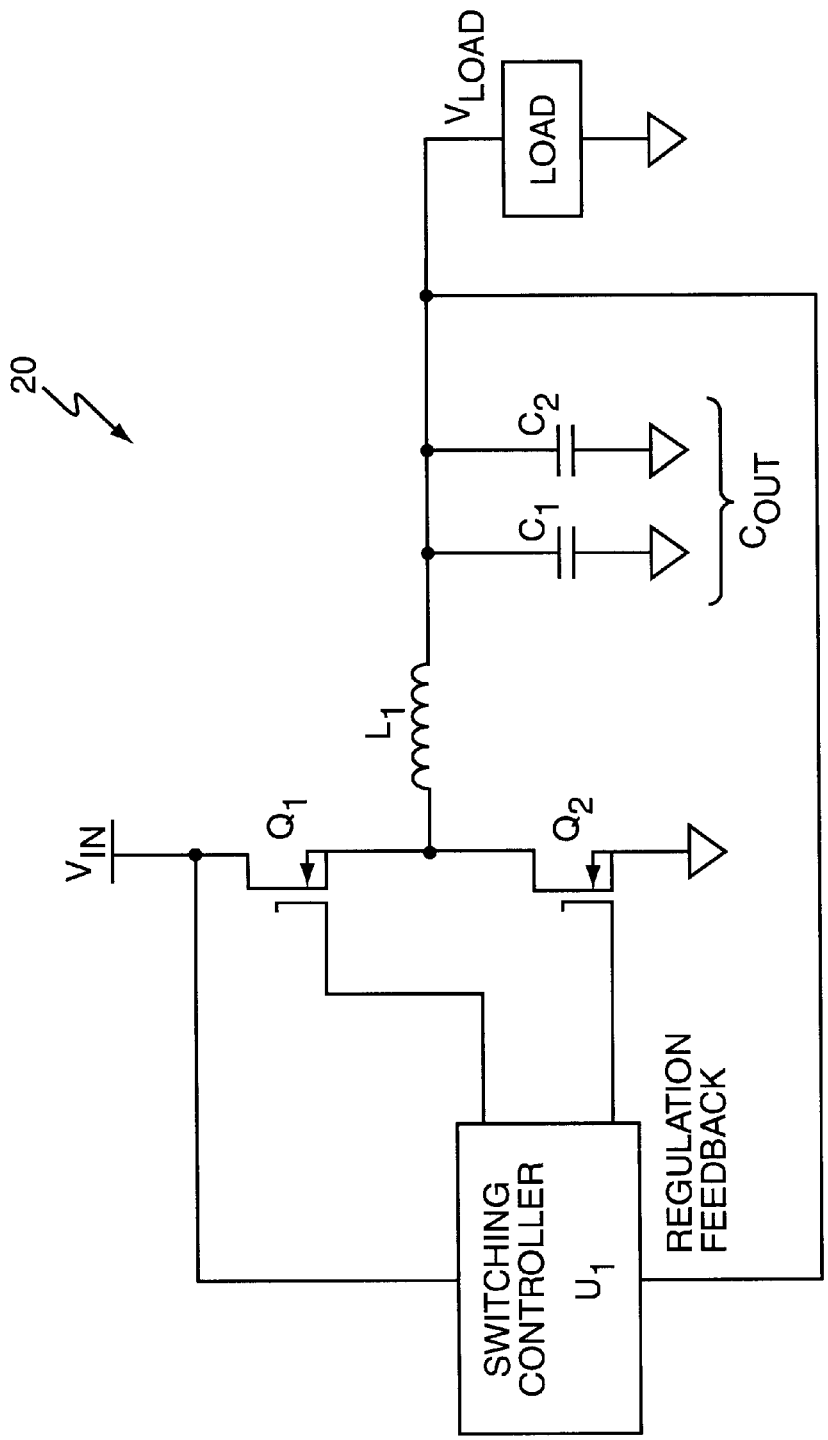
FIG. 2 is diagram of a conventional synchronous buck converter.

Switching regulators avoid the inefficiencies of linear regulation, thereby avoiding at least some of the potential heating problems. FIG. 2 illustrates a conventional synchronous buck DC-DC converter, which converts an input voltage (Vin) to a desired, lower output voltage (Vout). Thus, regulator 20 functions as a step-down converter. Other switching topologies are available, and, in general, switching converters offer step-up, step-down, and negative conversion options.

In operation, the switching controller U1 synchronously switches the N-channel field effect transistors (FETs) Q1 and Q2 on and off in opposite phase. This switching action intermittently connects the output load to the supply voltage (Vin) through high-side FET Q1 and inductor L1. This switching action induces a ramping current in L1 that may be smoothed by output capacitors C1 and C2, to provide a relatively low-ripple output voltage to the load. A feedback signal, usually taken from the load, is used by the switching controller U1 to control switching of Q1 and Q2 to maintain the output voltage at the desired level.

Many configurations and numbers of output capacitors are used with switching converter applications. In the example given, one might choose a relatively large C1, and a somewhat smaller C2. Preferably, both capacitors would be chosen to have low ESR values. With low ESR, the capacitors C1 and C2 are better able to act as a local current reservoir that provides current to the load during transient current conditions. As such, these output capacitors can greatly enhance the transient response of the regulator 20. For example, if the load current undergoes a step change increase, much of the initial current comes from C1 and C2 rather than through L1.

Indeed, this latter observation hints at one potential shortcoming of switching converters. That is, switching converters are sometimes difficult to implement in terms of achieving good transient response. Depending upon the feedback topology chosen (voltage-mode, current-mode, etc.), the regulation control loop of a switching converter may be relatively slow in comparison to microsecond step changes in load current. Output capacitance, as noted above, helps but does not entirely remedy the problem. Besides, output capacitors can be bulky and are often expensive, particularly when extremely low ESR values are required.

Figure 3:
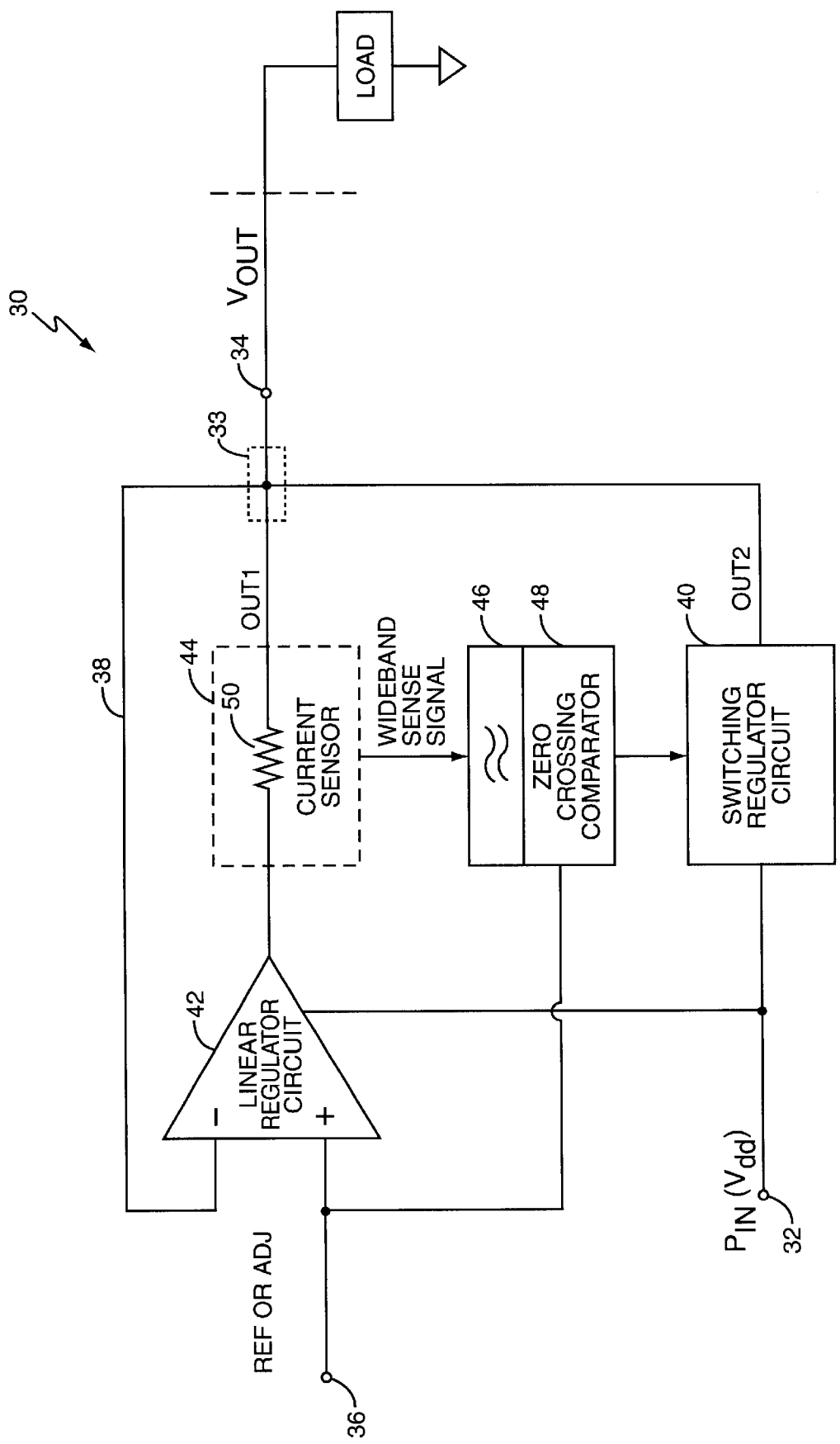
FIG. 3 is a diagram of an exemplary DC-DC converter in accordance with the present invention.

FIG. 3 illustrates an exemplary embodiment of the present invention. This embodiment combines the transient response advantages of linear power regulation with the efficiency of a switching converter. The exemplary converter 30 comprises an input terminal 32, a summing node 33, an output terminal 34, a reference terminal 36, a switching regulator circuit 40, a linear regulator circuit 42, a current sensor circuit 44, low-pass filter 46, and a comparator circuit 48.

The converter 30 generates a first regulated output signal from its linear regulator circuit 42, and a second regulated output signal from its switching regulator circuit 40. These two output signals are combined at the summing node 33 to form the combined regulated output signal provided at output terminal 34 for coupling to the load. In operation, the converter 30 maintains the combined regulated output signal at a desired regulation voltage across varying line and load conditions. Complimentary operation of the linear regulator 42 and switching regulator 40 allows tight regulation of load voltage, excellent transient response, and relatively high operating efficiency.

Conventional DC-DC switching regulators, even those with relatively high switching frequencies, e.g., greater than 1 MHz, use output capacitance (see FIG. 2) to enhance their ability to provide transient current in rapid load changes, and to minimize output voltage ripple. In contrast, the exemplary converter 30 relies on the linear regulator 42 for those purposes. Essentially, the switching regulator 40 provides virtually all of the steady state and lower frequency load current, thereby capitalizing on its inherent conversion efficiency advantages, while the linear regulator 42 provides short-duration transient current and AC noise compensation.

The combined regulated output signal is fed back to the linear regulator 42 so that it can quickly respond to changes in converter output voltage arising from transient changes in load current. This feedback connection 38 also carries the voltage ripple signal associated with the switching output of the switching regulator 40. In response to this ripple feedback, the linear regulator 42 generates an out-of-phase ripple compensation signal that substantially cancels output ripple in the combined regulated output signal. One noteworthy observation is that feedback path 38 might be implemented as a separate pin, which would allow the feedback signal to be taken directly at the load. Of course, the need for this modification depends on design requirements and on the electrical characteristics of the connection between pin 34 and the load.

In essence, the efficient but comparatively slower operation of the switching regulator 40 is augmented by the less efficient but faster operation of the linear regulator 42. The DC and lower frequency current components of the combined regulated output signal, which comprise the majority of the load power required, are provided by the switching regulator 40, while the higher frequency current components of the combined regulated output signal are provided by linear regulator 42. Because these higher frequency current components, at least in terms of the higher magnitude ones, are relatively short lived, the linear regulator 42 is not required to provide significant load power for any extended period. Thus, the power dissipation concerns normally associated with higher power linear voltage regulation do not apply. Further, overall conversion efficiency of the converter 30 is heavily biased towards the higher efficiency of switching regulator 40.

By using linear amplification to bolster transient performance and non-linear amplification for efficient operation at high power, the converter 30 embraces some of the philosophies represented by the RF signal amplifier circuits detailed in U.S. Pat. No. 6,300,826 B1 to Mathe, et al., which is incorporated herein by reference in its entirety. However, exemplary embodiments of the present invention represent a significant departure from the RF amplifier circuits detailed in the '826 patent, because circuit topologies herein are adapted to achieving efficient power regulation.

Figure 4:
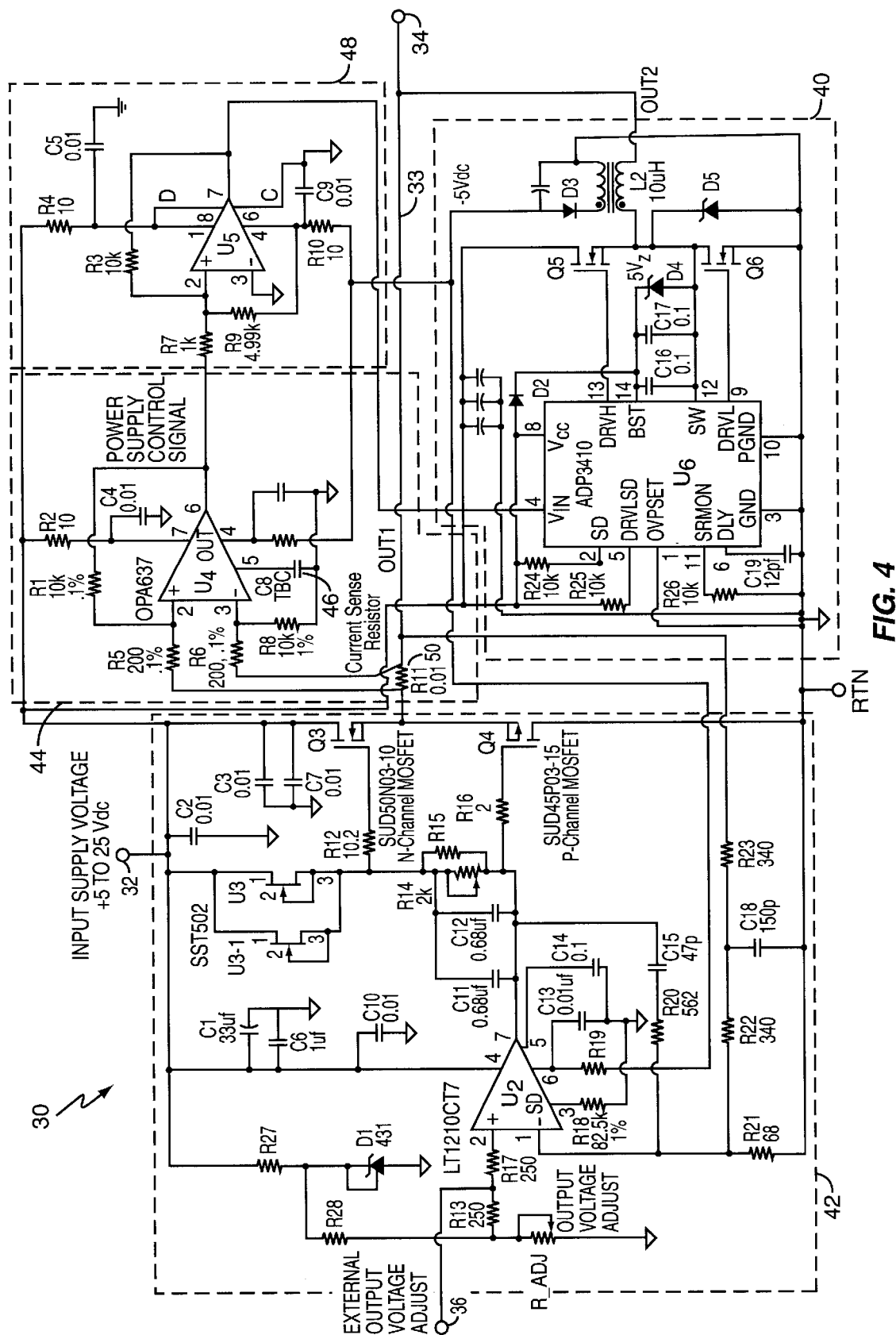
FIG. 4 is a diagram of an exemplary embodiment of the circuit of FIG. 3.

FIG. 4 is an exemplary embodiment of the converter 30 illustrated in FIG. 3. While considerably more detailed in its circuit presentation, one can relate the primary elements of FIG. 4, namely the switching regulator circuit 40, linear regulator circuit 42, current sensor 44, and comparator circuit 48 back to the top-level presentation in FIG. 3.

Here, the linear regulator circuit 42 principally comprises an operational amplifier U2 and supporting circuitry, which is configured as a differential amplifier and driven by feedback signal taken from the summing node 33. The op-amp U2 receives the reference or adjustment signal from an external source applied to input terminal 36. U2 generates an output signal that drives FETs Q3 and Q4, which are configured as a Class AB amplifier stage driving the first output signal (OUT1) into the summing node 33 through sense resistor 50. The dual JFET current regulator diodes (SST502) provide gate bias voltage that prevents the AB output stage (i.e., FETs Q3 and Q4) from turning off completely at zero crossing, thereby reducing distortion.

With the configuration as described above, the OUT1 signal from the linear regulator circuit 42 is maintained at the desired output voltage, the regulation voltage, as set by the reference input signal on input terminal 36. It should be understood that the linear regulator circuit 42 might have its own internal reference generator, which provides the needed reference voltage. A simple band gap voltage reference represents just one example of an internal reference generator. In many instances, however, external control of the regulated voltage level is desirable in many applications, such as where the load comprises a variable voltage microprocessor.

Regardless of whether the reference signal is internally or externally generated, the operational amplifier U2 receives the input reference signal (REF) and the feedback signal taken from node 33, and generates an output signal responsive to the voltage difference between these signals. With this closed-loop feedback control, the linear regulator circuit 42 adjusts its output signal (OUT1) to maintain the voltage of the converter's combined output signal at the desired regulation voltage. That is, linear regulator circuit 42 is made responsive to the output voltage of the converter 30, which enables it to respond to transient changes in the load current to that the regulated voltage is maintained.

An added point of flexibility derives from the use of a potentiometer on the reference input of U2 (shown coupling one end of R13 to ground through an adjustable resistance). Of course, the input potentiometer may not be needed or desired in some applications, but its use does allow for adjusting the output voltage of the combined output signal provided by converter 30 to a desired level for a given reference signal input voltage.

It should be understood that the transient response of the converter 30 is primarily a function of the bandwidth of the linear regulator circuit 42. The bandwidth of the linear regulator circuit 42 or, more specifically, that of the U2-based amplifier circuit may be set by proper component selection and should be tailored to the needs of the design at hand.

Thus, the integrated circuits (ICs), e.g., U2, U3, and the passive components, e.g., C1, C2, R14, etc., comprising the linear regulator circuit 42 may change in type, value, number, and layout, to tailor the circuit for different operating frequencies. This exemplary embodiment uses a LT1210CT7 current feedback amplifier from Linear Technology Corporation, which has a business address of 720 Sycamore Drive Milpitas, Calif., 95035, as the differential amplifier U2. Other component selections include the current regulator diodes of U3, which are part of a SST502 device from Vishay Siliconix, and the A/B output FETs Q3 and Q4, which here are SUD50N03 P- and N-channel FET devices also from Vishay Siliconix.

The current sensor 44 comprises an operational amplifier network including U4, which is differentially coupled across the sense element 50 that is disposed in series with the signal output from the linear regulator circuit 42. Here, U4 is implemented as an OPA637 high-speed operational amplifier from the BURR-BROWN series of products from Texas Instruments, Inc. Note that the filter circuit 46 is formed from a combination of C8 and internal compensation circuitry of the OPA637 device. That is, the desired roll-off on the signal output from terminal 6 of the OPA637 may be set by appropriately sizing capacitor C8.

In general, the frequency bandwidth of the current sensor 44 should be matched to the desired performance of the switching regulator circuit 40. That is, the responsiveness of the switching regulator circuit 40 is enhanced if current sensor 44 is responsive to higher frequency current components passing through the current sense element 50. In this sense, then, the ultimate transient response of the converter 30 is set by the bandwidth of the linear regulator circuit 42, but the overall responsive of the converter 30 may be bolstered by configuring the current sensor 44 for wideband current sensing.

The comparator circuit 48 utilizes any one of wide range of open-drain/open-collector high-speed comparators that are commercially available. Here, the open-drain output of the integrated circuit comparator U5 is pulled up to supply voltage rail coupled to the supply input terminal 32. In this exemplary embodiment, the converter 30 receives a supply signal ranging from five to twenty-five Volts on supply input terminal 32. Thus, the frequency and/or duty cycle of the switching control signal output from terminal 7 of U5 is controlled by the current sense signal output from current sensor 44, and by the amount of switching hysteresis used in comparator U5's circuit configuration. Here, resistors R3, R7, and R9 control the switching hysteresis of U5, and may be set as desired to balance between noise immunity and switching sensitivity, as is well understood by those skilled in the art.

Effectively, the above arrangement makes generation of the switching control signal dependent on the magnitude of the current supplied by the first signal, as generated by the linear regulator circuit 42. Of course, other current-sensing techniques might be used as desired, but the point is to use the switching regulator circuit 40 to reduce or minimize the sustained, high-magnitude current that must be provided by the linear regulator circuit 42. That is, when the magnitude of the current provided by the linear regulator circuit 42 increases, the switching regulator circuit 40 should respond, albeit more slowly, by increasing the magnitude of its output current.

The above effect may be accomplished in a number of ways, depending on the implementation and topology of the switching regulator circuit 40, and, for example, the comparator circuit 48. In the illustrated approach, the sense signal generated by the current sensor 44 increases with increasing current, which effectively causes the switching control signal to be generated at a higher frequency, thereby increasing the "on-time" of the switching regulator circuit 40. In other approaches, the duty cycle might be changed, rather than the switching frequency. Also, the term on-time is relative, and might change in sense depending on whether positive or negative voltage generation is being provided.

In a detailed presentation of the exemplary switching regulator circuit 40, it principally comprises the switching controller IC U6, output switching FETs Q5 and Q6, and the switched output inductor L2. Here, U6 comprises an ADP3410 dual MOSFET driver from Analog Devices, Inc., which maintains a business address at One Technology Way, Norwood, Mass. The ADP3410 provides switching drive signals to the gates of the high-side and low-side N-channel FETs Q5 and Q6, respectively. Thus, Q5 and Q6 alternately switch the inductor L2 from the power supply connected to input terminal 32 and signal ground (the RTN terminal). L2 is shown with an exemplary inductance value of 10 micro Henrys, but its actual inductance value in a given design will depend on the load characteristics.

Of course, the specific implementation details and particular circuit topologies shown in FIG. 4 are subject to significant variation depending on actual design needs. Those skilled in the art will understand that circuit details and component selections may be varied significantly from that shown in FIG. 4 without varying from the scope of the present invention. As an example of such variation, FIGS. 5A and 5B replicate, collectively, many of the details of FIG. 4, but include selected changes that increase the performance of the converter 30.

In this implementation, the bandwidth of the linear regulator circuit 42 is increased by adjusting the filter characteristics of the inner and outer feedback loops used in the U2 amplifier network. More particularly, the bandwidths of the inner and outer amplifier feedback loops are adjusted by reducing the sizes of C15 and C18, respectively. Of course, resistor values might also be adjusted, or other approaches to increase feedback bandwidth might be adopted. As an example, one might vary the selection of amplifier U2 to meet overall bandwidth requirements. The core point is that the feedback bandwidth influences the amplifier's ability to respond to output transients and should be set in accordance with desired performance.

One might notice the use of dual feedback loops and such usage allows the U2 amplifier circuit simultaneously to exhibit high bandwidth and good stability. More details on this "dual feedback" approach are available in the co-pending and commonly assigned U.S. patent application entitled "Dual Feedback Linear Amplifier," which was filed on Jan. 23, 2002, and is incorporated herein by reference in its entirety.

In an exemplary configuration, the linear regulator circuit 42 is configured to have a bandwidth (BW) of about 30 MHz. This bandwidth capability translates into a transient response (TR) of about 33 nanoseconds using the well-known approximation TR=(1/BW). Here, transient response defines the converter's ability to respond to both line and load changes. For example, the converter 30 would maintain its regulated output voltage in the presence of a change in input (supply) voltage, a change in the programmed or desired output voltage (i.e., an adjustment in the reference signal), or a change in the load current, provided that the time associated with each of the changes does not exceed the step-change response time of 33 nanoseconds. Of course, the linear regulator circuit 42 and, in turn, the overall converter 30 may be tuned to meet essentially any reasonable transient response requirement through appropriate component selection and circuit layout.

Figure 5A:
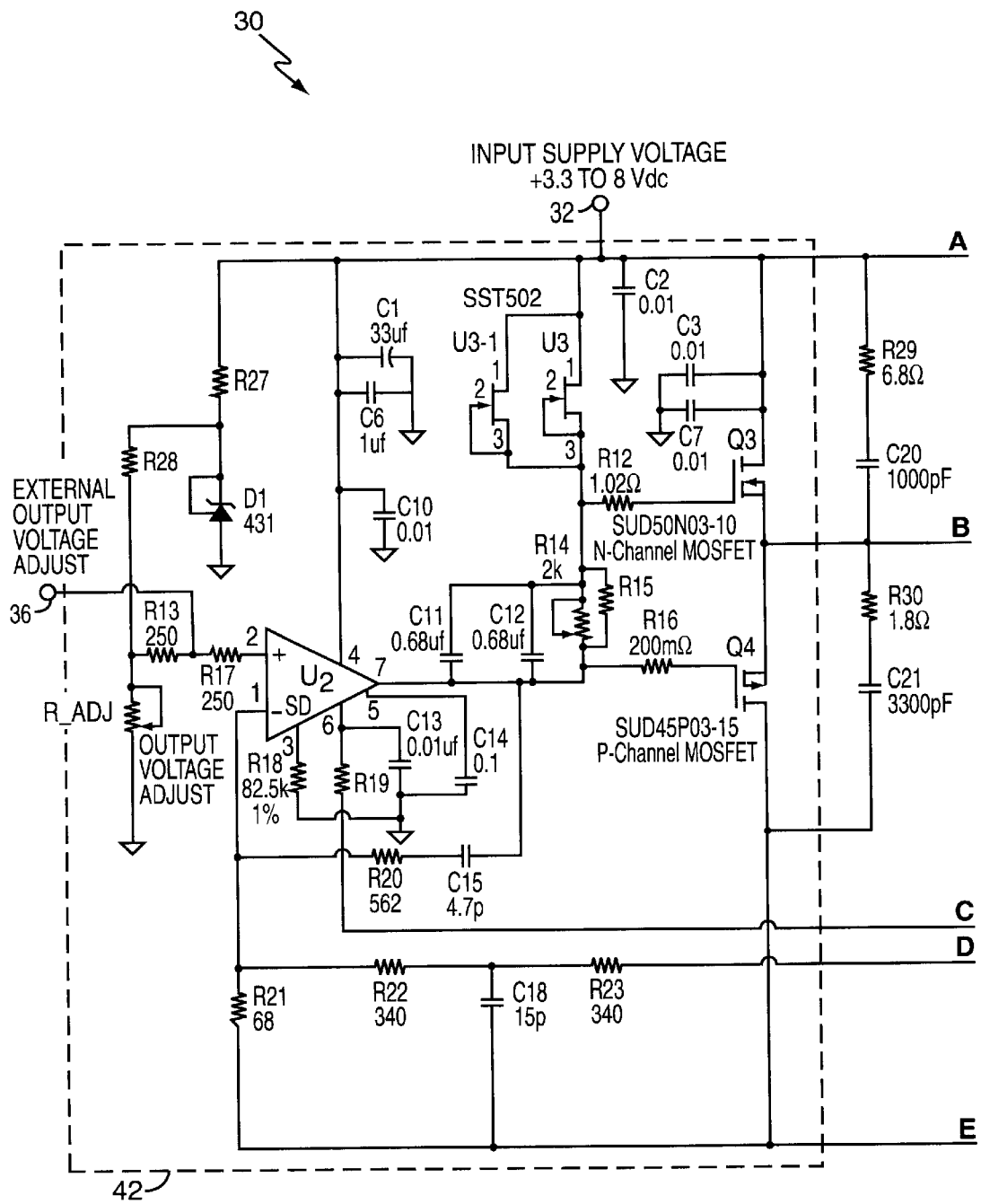
FIGS. 5A and 5B are, collectively, a diagram of another exemplary embodiment of the circuit of FIG. 3.
Figure 5B:
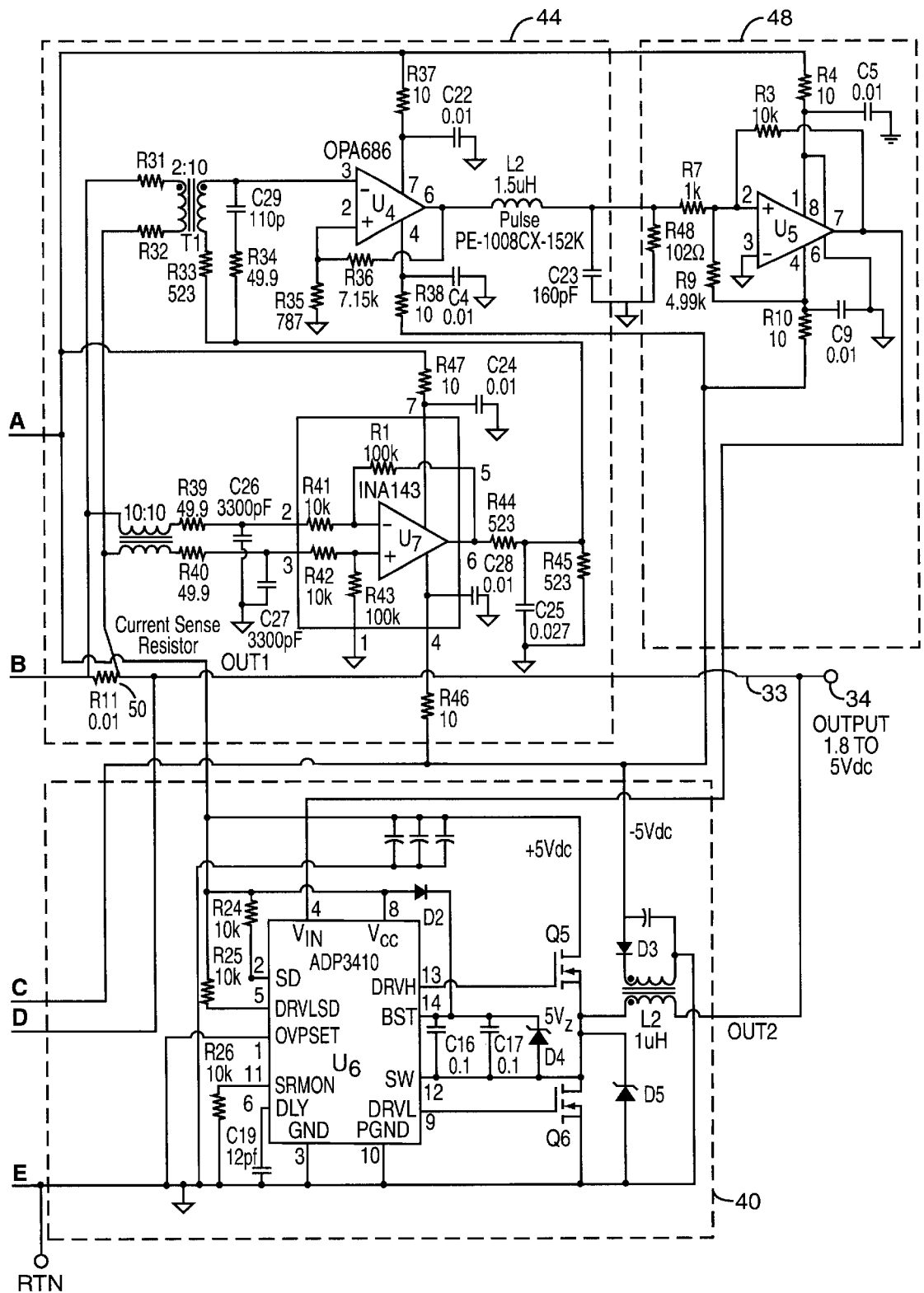

FIGS. 5A and 5B further illustrate a higher performance current sensor 44. Specifically, the current sensor 44 is implemented as a wideband current sensor of the type illustrated and explained in the pending and commonly assigned U.S. patent application entitled "Wideband Precision High Common Mode Rejection Current Sensor," filed on Dec. 21, 2001, which is incorporated herein by reference in its entirety. As noted above, incorporation of wideband current sensing enhances the responsiveness of the switching regulator circuit 40.

Figure 6:
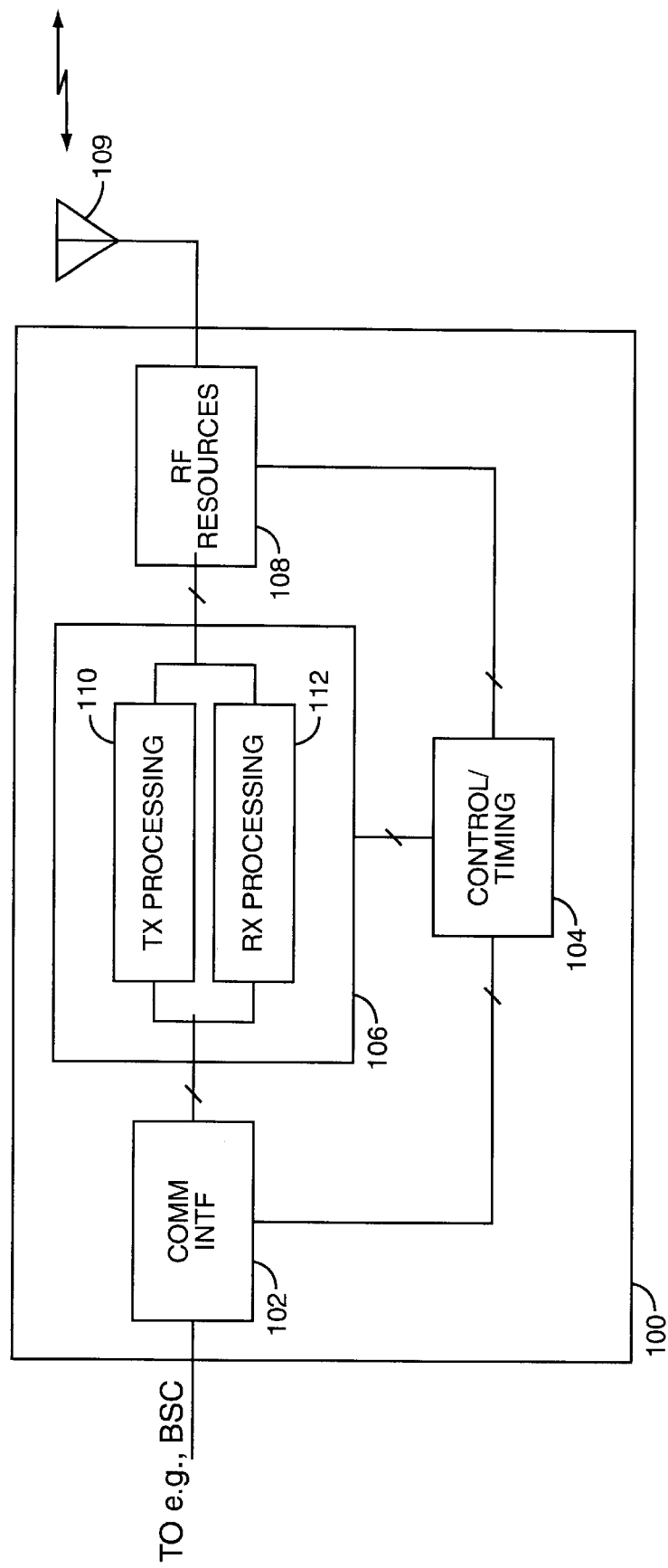
FIG. 6 is a diagram of an exemplary radio base station of the present invention.

There are numerous applications where the converter 30 may be advantageously used. The application illustrated in FIG. 6 depicts one such use, wherein the converter 30 powers signal processing and other computational systems within a radio base station.

It should be understood that RBS architecture varies widely, and this illustration merely depicts one possible functional organization. Nonetheless, in this exemplary embodiment, the RBS 100 comprises a communication interface 102, a control and timing unit 104, a signal processing system 106, and varied radio frequency resources 108.

In operation, the RBS 100 generally operates under control of an associated base station controller (BSC), which is not shown for the sake of brevity. For example, the RBS 100 may communicatively link to the remote BSC by T1/E1 lines, or by a microwave communication link. In any case, control, timing, and data traffic typically flow between the BSC and the RBS 100.

Traffic intended for mobile stations (not shown) operating with the radio coverage area of the RBS 100 is typically processed for transmission, amplified, and then transmitted via antenna 109, which may comprise one or more antennas, antenna elements, or arrays.

Transmit processing typically includes encoding the data traffic into uniquely defined symbols suitable for modulating the phase and/or amplitude of a selected RF carrier. However, as those skilled in the art will well understand, the particular details of encoding and channelizing traffic data for transmission are potentially complex and vary as a function of the air interface employed by the communication network in which the RBS 100 is deployed. Receive processing generally entails the reverse of transmit processing. With respect to receive processing, incoming signals from the mobile stations are de-channelized, decoded, and appropriately reformatted for relay to the BSC. In any case, the specific details of these processes are not germane for understanding the benefits of using converter 30 within the RBS 100.

Transmit and receive processings typically use substantial signal processing resources, shown here as TX and RX processing resources 110 and 112, respectively. While subject to much variation, these resources typically comprise one or more digital processors, which may be high-performance microprocessors, dedicated digital signal processors (DSPs), custom circuits such as Application Specific Integrated Circuits (ASICs) and Field Programmable Gate Arrays, or any combination thereof. Regardless of the particular arrangement of processing circuits, these signal-processing resources are characterized by their high frequency of operation, and their attendant power supply needs.

Figure 7:
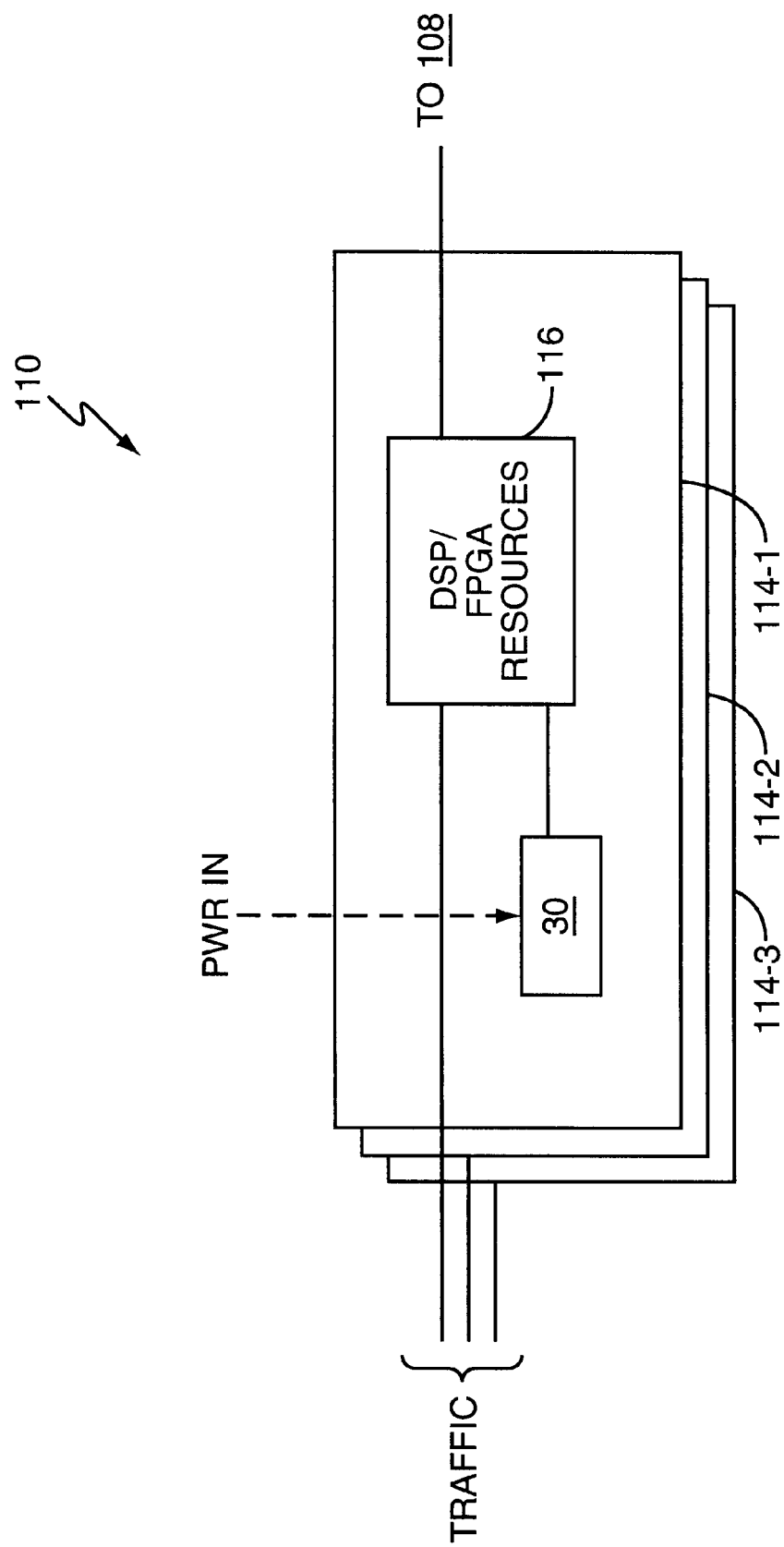
FIG. 7 is a diagram of exemplary details for the radio base station of FIG. 6, and illustrates an application of an exemplary DC-to-DC converter.

FIG. 7 focuses on the transmit processing resources 110, and includes exemplary details for "sub-rack" implementation, wherein each of sub-racks 114 (e.g., 114-1, -2, and -3) carries transmitter signal processing resources 110, such as DSPs and/or FPGAs resources 116. In this exemplary embodiment, the converter 30 provides regulated supply power to one or more DSPs and/or FPGAs (or ASICs) 116 on each sub-rack 114. With this approach, each sub-rack 114 carries at least one converter 30, which is powered by an input supply signal that may be generated locally on the sub-rack 114, or brought into the sub-rack 114 via connection with an external supply. Of course, these exemplary details may be varied significantly.

Indeed, the real focus in the context of the RBS 100 is that one or more converters 30 may be configured for high bandwidth operation, thereby imbuing them with excellent transient response and making them advantageous for powering the high-performance signal processing circuitry within the RBS 100. Thus, the details of FIG. 6 and FIG. 7 are useful in terms of illustrating exemplary arrangements, but should not be construed as limiting the application and configuration of converters 30 within the framework of powering communication-related equipment.

Further, it should be understood that, in generally, the above discussion and associated drawings highlight exemplary embodiments of the present invention. However, the present invention generally addresses power conversion using a combination of linear regulation for short-duration transient supply operation and nonlinear, switching regulation for steady state and lower frequency supply operation. This type of combination biases overall power conversion efficiency towards that of the switching regulator but substantially eliminates the need for the output capacitance that would otherwise be required. As such, the present invention is not limited by the foregoing detailed description rather it is limited only by the scope of the following claims, and the reasonable equivalents thereof.

What is claimed is:

1. A DC-to-DC converter for supplying a load with an output signal having a regulated voltage, the converter comprising:
    a linear regulator circuit to generate a first signal having higher frequency transient current components;
    a switching regulator circuit in parallel with the linear regulator circuit to generate a second signal having lower frequency and DC current components;
    a summing node to combine the first and second signals to form the output signal; and
    wherein the linear regulator circuit supplies a majority of transient current required by the load, and the switching regulator circuit provides a majority of steady-state current required by the load.

2. The DC-to-DC converter of claim 1, wherein the linear regulator circuit comprises an operational amplifier circuit to generate the first signal at the regulated voltage based on a reference signal and a feedback signal derived from the output signal, such that the first signal is responsive to voltage transients in the output signal.

3. The DC-to-DC converter of claim 2, further comprising a current sense element coupling the first signal from the operational amplifier circuit to the summing node.

4. The DC-to-DC converter of claim 3, further comprising a switching control circuit to generate a switching control signal, and wherein the switching regulator generates the second signal responsive to the switching control signal.

5. The DC-to-DC converter of claim 4, wherein the switching control circuit includes the current sense element, and further comprises:
    a current sensing circuit to generate a current sense signal responsive to a differential voltage signal developed across the current sense element by the first signal; and
    a comparator circuit to generate the switching control signal based on comparing the current sense signal to at least one comparator threshold derived from the reference signal.

6. The DC-to-DC converter of claim 5, wherein the current sensing circuit comprises:
    a first sensing circuit DC-coupled to the current sense element to generate a first sense signal proportional lower frequency signal components of the differential voltage signal;
    a second sensing circuit AC-coupled to the current sense element to generate a second sense signal proportional to higher frequency signal components of the differential voltage signal; and
    an output circuit coupled to the first and second sensing circuits to generate the current sense signal as a wideband sense signal by combining the first and second sense signals.

7. The DC-to-DC converter of claim 6, wherein the comparator circuit comprises a hysteretic comparator circuit.

8. The DC-to-DC converter of claim 1, wherein the DC-to-DC converter further comprises a reference signal input to receive a reference signal that sets the regulated voltage of the output signal.

9. The DC-to-DC converter of claim 8, wherein the DC-to-DC converter further comprises a supply signal input to receive a supply signal that provides a supply voltage signal to the DC-to-DC converter, and wherein the DC-to-DC converter derives the output signal from the supply voltage signal.

10. The DC-to-DC converter of claim 9, wherein the switching regulator circuit is a buck converter that generates the second signal by stepping down the voltage of the supply signal to the regulated voltage.

11. The DC-to-DC converter of claim 1, wherein the linear regulator circuit comprises a linear amplifier having a bandwidth of about 30 MHz, and wherein the transient response of the DC-to-DC converter is about 33 nanoseconds.

12. The DC-to-DC converter of claim 11, wherein the linear amplifier comprises a dual-feedback amplifier circuit having a high-frequency feedback loop, and a low-frequency feedback loop.

13. The DC-to-DC converter of claim 12, wherein the frequency responses of the high- and low-frequency feedback loops are tuned to provide a desired transient response of the DC-to-DC converter.

14. The DC-to-DC converter of claim 12, wherein the high-frequency loop comprises an inner feedback loop, and the low-frequency loop comprises an outer feedback loop.

15. A method of generating an output signal at a regulated voltage as a combination of first and second signals, the method comprising:
  generating the first signal using a linear regulator circuit having a first power conversion efficiency and configured to supply higher frequency current components of the output signal;
  generating a second signal using a switching regulator circuit having a second power conversion efficiency relatively higher than the first power conversion efficiency and configured to supply lower frequency and DC current components of the output signal; and
  combining the first and second regulated signals to form the output signal.

16. The method of claim 15, further comprising deriving a feedback signal for the linear regulator circuit from the output signal, such that the linear regulator circuit provides transient current responsive to voltage transients in the output signal.

17. The method of claim 16, wherein deriving the feedback signal further comprises feeding back switching voltage ripple to the linear regulator such that the linear regulator outputs a ripple compensation signal as a component of the first signal, and wherein the ripple compensation signal attenuates switching voltage ripple induced in the output signal by operation of the switching regulator circuit.

18. The method of claim 15, further comprising generating a switching control signal for controlling the switching regulator circuit based on sensing current in the first signal such that the switching regulator operates to reduce the amount of low frequency and DC current supplied by the linear regulator circuit.

19. The method of claim 15, further comprising:
  sensing a magnitude of the current supplied by the first signal; and
  generating a switching control signal for the switching regulator circuit responsive to the magnitude of the current supplied by the first signal.

20. The method of claim 19, wherein generating the switching control signal responsive to the magnitude of the current supplied by the first signal comprises generating the switching control signal such that the switching regulator circuit increases the current supplied by the second signal as the magnitude of the current supplied by the first signal increases.

21. The method of claim 19, wherein generating the switching control signal responsive to the magnitude of the current supplied by the first signal comprises increasing the effective on-time of the switching regulator circuit with increasing magnitude of the current supplied by the first signal.

22. The method of claim 19, further comprising setting a sensing bandwidth for sensing the current supplied by the first signal such that the switching regulator circuit has a desired responsiveness with regard to changes in the current supplied by the first signal.

23. A radio base station (RBS) for use in a wireless communication network, the RBS comprising:
  signal processing resources to perform at least one of transmit signal processing and receive signal processing; and
  at least one DC-to-DC converter for powering at least a portion of the signal processing resources, said DC-to-DC converter comprising:
    a linear regulator circuit to generate a first signal having higher frequency transient current components;
    a switching regulator circuit in parallel with the linear regulator circuit to generate a second signal having lower frequency and DC current components;
    a summing node to combine the first and second signals to form an output signal having a regulated voltage; and
    wherein the linear regulator circuit supplies a majority of transient current required by the signal processing resources powered by the output signal, and the switching regulator circuit provides a majority of steady-state current required by the signal processing resources powered by the output signal.

24. The RBS of claim 23, wherein the linear regulator circuit comprises an operational amplifier circuit to generate the first signal at the regulated voltage based on a reference signal and a feedback signal derived from the output signal, such that the first signal is responsive to voltage transients in the output signal.

25. The RBS of claim 24, further comprising a current sense element coupling the first signal from the operational amplifier circuit to the summing node.

26. The RBS of claim 25, further comprising a switching control circuit to generate a switching control signal, and wherein the switching regulator generates the second signal responsive to the switching control signal.

27. The RBS of claim 26, wherein the switching control circuit includes the current sense element, and further comprises:
  a current sensing circuit to generate a current sense signal responsive to a differential voltage signal developed across the current sense element by the first signal; and
  a comparator circuit to generate the switching control signal based on comparing the current sense signal to at least one comparator threshold derived from the reference signal.

28. The RBS of claim 27, wherein the current sensing circuit comprises:
  a first sensing circuit DC-coupled to the current sense element to generate a first sense signal proportional lower frequency signal components of the differential voltage signal;

a second sensing circuit AC-coupled to the current sense element to generate a second sense signal proportional to higher frequency signal components of the differential voltage signal; and an output circuit coupled to the first and second sensing circuits to generate the current sense signal as a wideband sense signal by combining the first and second sense signals.

29. The RBS of claim 28, wherein the comparator circuit comprises a hysteretic comparator circuit.

30. The RBS of claim 23, wherein the DC-to-DC converter further comprises a reference signal input to receive a reference signal that sets the regulated voltage of the output signal.

31. The RBS of claim 30, wherein the DC-to-DC converter further comprises a supply signal input to receive an input supply signal that provides a supply voltage signal to the DC-to-DC converter, and wherein the DC-to-DC converter derives the output signal from the supply voltage signal.

32. The RBS of claim 31, wherein the switching regulator circuit is a buck converter that generates the second signal by stepping down the voltage of the supply signal to the regulated voltage.

33. The RBS of claim 23, wherein the linear regulator circuit comprises a linear amplifier having a bandwidth of about 30 MHz, and wherein the transient response of the DC-to-DC converter is about 33 nanoseconds.

34. The RBS of claim 33, wherein the linear amplifier comprises a dual-feedback amplifier circuit having a high-frequency feedback loop, and a low-frequency feedback loop.

35. The RBS of claim 34, wherein the frequency responses of the high- and low-frequency feedback loops are tuned to provide a desired transient response of the DC-to-DC converter.

36. The RBS of claim 34, wherein the high-frequency feedback loop comprises an inner feedback loop, and the low-frequency feedback loop comprises an output feedback loop.

37. The RBS of claim 23, wherein the RBS further comprises at least one sub-rack, and wherein the sub-rack carries at least a portion of the signal processing resources, and further wherein each sub-rack carries said at least one DC-to-DC converter configured to power at least a portion of the signal processing resources carried on the sub-rack.

38. The RBS of claim 23, wherein the RBS further comprises at least one additional power supply, and wherein the at least one additional power supply generates a supply signal for supplying said at least one DC-to-DC converter.

* * * * *